(12) United States Patent
Duepmeier et al.

(10) Patent No.: US 12,510,310 B2
(45) Date of Patent: Dec. 30, 2025

(54) HEAT EXCHANGER PLATE

(71) Applicant: BENTELER AUTOMOBILTECHNIK GMBH, Paderborn (DE)

(72) Inventors: Tobias Duepmeier, Paderborn (DE); Elmar Grussmann, Altenbeken (DE); Guenter Fortmeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 134 days.

(21) Appl. No.: 18/589,397

(22) Filed: Feb. 27, 2024

(65) Prior Publication Data
US 2024/0288233 A1     Aug. 29, 2024

(30) Foreign Application Priority Data
Feb. 27, 2023 (EP) ...................... 23158876

(51) Int. Cl.
*F28F 3/12* (2006.01)
*B23K 1/00* (2006.01)
(Continued)

(52) U.S. Cl.
CPC .............. *F28F 3/12* (2013.01); *B23K 1/0012* (2013.01); *B23K 1/20* (2013.01); *F28F 3/10* (2013.01);
(Continued)

(58) Field of Classification Search
CPC .... F28F 3/12; F28F 3/10; F28F 9/0248; F28F 2275/045; F28F 2275/06; B23K 1/0012; B23K 1/20; B23K 2101/14
(Continued)

(56) References Cited

U.S. PATENT DOCUMENTS 8,418,517 B2 * 4/2013 Uneno ...................... F28F 3/12
                                                           72/368
10,006,571 B2 * 6/2018 Brunschwiler ......... F16L 21/03
(Continued)

FOREIGN PATENT DOCUMENTS

CA         2828990 A1    9/2012
DE    102010051106 B4    5/2017
(Continued)

OTHER PUBLICATIONS

Extended European Search Report for European Application No. 23158876.5 mailed Aug. 1, 2023; 11pp.

*Primary Examiner* — Jon T. Schermerhorn, Jr.
(74) *Attorney, Agent, or Firm* — HAUPTMAN HAM, LLP (57) ABSTRACT

A heat exchanger plate which has a plate body formed from at least two plate elements and at least one connecting piece for a cooling fluid. The plate body and connecting piece are joined together using soldering. The connecting piece has a joining portion which is joined in a receiving portion of the plate body formed between the plate elements. A solder resist limits the flow of solder when producing the solder connection. The solder resist is able to be formed by a sealing metal, which is arranged on the joining portion of the connecting piece in front of and/behind a solder material applied to the joining portion. The solder resist is able to be formed by an annular bead resting on the end face of the receiving portion.

15 Claims, 8 Drawing Sheets

(51) Int. Cl.
  *B23K 1/20* (2006.01)
  *B23K 101/14* (2006.01)
  *F28F 3/10* (2006.01)
  *F28F 9/02* (2006.01)

(52) U.S. Cl.
  CPC ........ *F28F 9/0248* (2013.01); *B23K 2101/14* (2018.08); *F28F 2275/045* (2013.01); *F28F 2275/06* (2013.01)

(58) Field of Classification Search
  USPC ......................................................... 165/173
  See application file for complete search history.

(56) References Cited

U.S. PATENT DOCUMENTS

| | | | |
|---|---|---|---|
| 2002/0079095 A1 | 6/2002 | Davies et al. | |
| 2007/0062681 A1 | 3/2007 | Beech | |
| 2010/0320753 A1 | 12/2010 | Uneno | |
| 2011/0232887 A1 | 9/2011 | Zaffetti et al. | |
| 2012/0237805 A1 | 9/2012 | Abels et al. | |
| 2013/0161942 A1 | 6/2013 | Balbo Di Vinadio | |

FOREIGN PATENT DOCUMENTS

| | | | | |
|---|---|---|---|---|
| DE | 102020201131 A1 | * | 8/2021 | ............... F28D 9/00 |
| EP | 0228581 A1 | * | 7/1987 | ................ F28F 1/02 |
| EP | 1306638 A2 | * | 5/2003 | ........... F28D 9/0012 |
| EP | 1352171 B1 | | 10/2003 | |
| EP | 1152204 B1 | * | 11/2003 | ............. F28D 9/005 |
| EP | 1764573 B1 | | 3/2007 | |
| EP | 2260957 B1 | | 12/2010 | |
| EP | 2607832 A1 | | 6/2013 | |
| EP | 2372761 B1 | | 10/2016 | |
| EP | 3741876 A1 | | 11/2020 | |
| EP | 4209289 B1 | * | 6/2024 | ............. B23P 15/26 |

* cited by examiner

HEAT EXCHANGER PLATE

RELATED APPLICATIONS

The present application claims priority of European Application Number 23158876.5 filed Feb. 27, 2023, the disclosure of which is hereby incorporated by reference herein in its entirety.

FIELD

The present disclosure relates to a heat exchanger plate for cooling a battery in motor vehicles.

BACKGROUND

Heat exchanger plates are used for a wide variety of applications. A heat exchanger plate of the type in question is a cooling plate for cooling the batteries of motor vehicles.

The increased demands on electric vehicles in terms of range, driving performance and charging time mean that the thermal stress on the batteries increases due to overheating or aging. To reduce these harmful effects, the operating temperature of a battery is limited by means of temperature control elements through which media flows. The temperature control elements are heat exchanger plates in the form of cooling plates that are arranged above, to the sides, and/or below a battery module.

Heat exchanger plates include joined aluminum sheets or extruded aluminum profiles, which allow temperature control medium or cooling fluid to flow through the heat exchanger plates via connecting pieces. The connecting pieces are manufactured by shaping or by machining and connected to the plate body of a cooling plate. The connecting pieces enable quick installation of cooling fluid lines.

According to EP 2 372 761 B1, a cooling plate with a plate body formed from two plate elements is described, in which fluid connections or connecting pieces for cooling fluid are arranged on a flat surface of a plate element parallel to the surface of the plate element.

In the cooling plate described in EP 2 607 832 A1, the supply and discharge of cooling fluid takes place via connector pieces which are able to be inserted with a connection portion into a receptacle on the plate element.

In the battery cooling plate described in EP 3 741 876 A1, the plate body is likewise formed by two plate elements and has connecting pieces for cooling fluid, wherein a connecting piece is aligned parallel to the plane of the plate elements and is integrated with a connection portion in a receiving portion of the plate body.

DE 10 2010 051 106 B4 describes a cooling plate that has at least one cooling channel for conducting a coolant, which channel is provided with at least one inlet and at least one outlet. The cooling plate has at least two plate elements lying flat against one another, in which bulges are formed which together form a cooling channel. The inlet and the outlet are each provided with a connecting piece for connecting the cooling channel to a coolant connection unit.

The EP 1 764 573 B1 reference describes a heat exchanger plate which has a plate body formed from at least two plate elements and at least one connection piece for a cooling fluid. The plate elements and the connection pieces are joined together by soldering, with the connection piece having a joining portion which is joined in a receiving portion of the plate body formed between the plate elements. The connecting piece has an annular flange which rests against the end face of the receiving portion of the plate body.

Other heat exchangers with connection components are described in EP 2 260 957 B1 or EP 1 352 171 B1.

SUMMARY

The present disclosure relates to a functionally and technically improved heat exchanger plate and to ensure an assembly-friendly, process-reliable and rational joining of a connecting piece to the plate body of a heat exchanger plate.

A cooling plate has a plate body formed from two plate elements and connecting pieces for the supply and discharge of a cooling fluid. The plate elements are, for example, a channel plate and a base plate, which are brought together to form a plate stack and joined together to form the plate body. The connecting pieces are joined to the plate body. At least one connecting piece has a joining portion which is joined in a receiving portion of the plate body formed between the plate elements. The orientation of the joining portion of the connecting piece is parallel to the plane of the plate elements. Outside the plate body, the connecting piece is able to have arched and/or curved portions. The part of the connecting piece that runs outside the plate body is configured as a coupling portion for connecting a connecting line for a cooling fluid.

The plate elements are able to be made of light metal or a light metal alloy, for example, an aluminum alloy.

At least one plate element of the plate body of the cooling plate has a channel structure for conducting a cooling fluid.

The connecting piece is positioned with its joining portion in the receiving portion of the plate body and is joined thereto by soldering with a material bond. The at least two plate elements are also joined together using soldering at their adjacent joining surfaces. The soldering process is carried out in a mold soldering tool. This means that the joining partners, i.e. the components forming the heat exchanger plate, namely at least the two plate elements and the connecting piece(s), are clamped in the mold soldering tool and pressed against one another, the connecting portion of the plate body being formed in the mold soldering tool by deformation of mold portions provided on the plate elements and the components being heated in the mold soldering tool to a temperature above the melting temperature of the solder material used, so that the solder material melts into a liquid phase and after the solder material has solidified, a material connection of the components is created.

At least one solder resist is provided according to the present disclosure, which limits the flow of solder when producing the solder connection. The solder resist allows the solder flow to be geometrically reliably limited when producing the solder connection. The solder resist is able to be set up, defined and positioned to prevent blowing out of the molten solder material during the internal pressure forming of one or more plate elements.

To form one or more channels in at least one of the plate elements, the plate elements are clamped in a mold soldering tool and a space between the plate elements is subjected to internal pressure. For this purpose, an active medium is passed into the space and one or more channels are created. The solder resist is designed and set up and positioned to prevent the solder material that is molten in this phase from being blown out as a result of the internal pressure.

The solder resist is formed according to the present disclosure by a sealing metal which has a higher melting temperature than the solder material used for the soldering joint. The solder resist in the form of sealing metal becomes plastic under the influence of temperature in the mold soldering tool. The sealing metal deforms under the pressing pressure and seals the gap between the plate elements and the connecting piece or the joining portion of the connecting piece, so that a solder flow is able to be limited in a targeted manner to the joining region between the joining partners.

The solder resist is arranged on the joining portion of the connecting piece. The solder resist is able to be provided on the inside of the plate body in front of the joining portion in the receiving portion of the plate body. The solder resist is able to be arranged on the front side in the region in front of the opening of the receiving portion.

Advantageous embodiments provide that the solder resist is arranged in the longitudinal direction of the joining portion in front of and/or behind a solder material applied to the joining portion.

The solder resist is geometrically tailored to the joining gap between the joining portion and the connecting piece. The solder resist is able to be geometrically matched to the inner contour or the inner cross section of the receiving portion. In the present disclosure, the solder resist has longitudinal webs running in the longitudinal direction of the joining portion, which are adapted to longitudinal grooves which extend along the receiving portion of the plate body in its joining plane between the two joined plate elements.

A further embodiment provides that the solder resist is formed by an annular bead resting on the end face of the receiving portion.

The annular bead is formed in one piece from the wall of the connecting piece using the same material. The annular bead protrudes beyond the outer circumference of the connecting piece and extends in a ring shape.

The annular bead is able to be formed by a compression process. The annular bead is able to be formed in the mold soldering tool during the production of the plate body. For this purpose, the connecting piece is clamped and compressed between the plate elements in the mold soldering tool.

The annular bead acts as a stop and determines the position or the insertion length of the connection portion in the receiving portion. Furthermore, the opening of the receiving portion is sealed by the annular bead and the seal between the joining portion of the connecting piece and the receiving portion is improved.

In the present disclosure, the solder resist is formed by a cross-sectional change in the joining portion of the connecting piece and in the receiving portion. The solder resist is formed by the cross-sectional change in the joining region between the receiving portion formed in the forming portions of the plate elements and the connecting piece. Both the joining portion and the receiving portion have two longitudinal portions with different cross sections. The longitudinal portions of the joining portion, as well as the longitudinal portions of the receiving portion, transition into one another via a transition portion.

The changes in cross-section in the joining portion and in the receiving portion complement each other and there is a reduction in the cross-section of the annular space between the joining portion and the receiving portion. The solder material that melts during the soldering process is stopped in the cross-sectional change between the joining portion and the receiving portion. This limits the solder flow when producing the soldered connection.

Several solder resist are able to be provided. Two different solder resist or types of solder resist are able to be used in combination. A solder resist is able to be provided in the form of a cross-sectional change in the joining portion of the connecting piece and a corresponding complementary cross-sectional change in the receiving portion. Furthermore, a solder resist is able to be provided in the form of a mechanical solder stop barrier, for example, a separate ring body made of a solder stop material or a solder stop body or ring integrally formed in the connecting piece using the same material.

The joining portion of the connecting piece is able to be circular in cross section.

An alternative provides that the joining portion is elliptical in cross section.

In the present disclosure, the joining portion is configured to be rectangular in cross section, with the corners of the rectangle being rounded.

In the present disclosure, the joining portion has two longitudinal portions, wherein the two longitudinal portions have a cross section that differs from one another. The receiving portion also has two longitudinal portions which have a different cross section. This configuration is advantageous in terms of assembly or manufacturing technology as well as with regard to the joining technology. At the transition between the longitudinal portions with different cross sections, a shoulder is formed, which improves the positional fixing or orientation of the joining portion in the receiving portion. Furthermore, the shoulder is able to form a pull-out protection. The shoulder forms an abutment between the joining portion and the receiving portion. When the plate body is subjected to internal pressure to form the channel using internal pressure technology, the connecting piece is supported on the abutment.

The solder resist provided according to the present disclosure is able to be formed by the cross-sectional change in the joining portion and in the receiving portion.

In the present disclosure, the connecting piece has a coupling portion on the opening side for connecting a cooling fluid line. The opening side of the connecting piece is the side via which the supply or discharge of cooling fluid takes place via a cooling fluid line. The coupling portion stands or projects freely from the plate body of the cooling plate.

A solder resist is able to be formed from a solder material. As a result, two solder materials with different material properties are applied. A solder material of the first type is the solder material that is applied to or around the joining portion of the connecting piece in order to realize the material connection between the joining portion and the receiving portion. A solder material of the second type has a higher melting temperature than the solder material of the first type and forms the solder resist. The solder material of the second type melts later or only at higher temperatures when the connecting piece and the receiving portion are heated in the mold soldering tool so that the solder material of the second type is more viscous than the solder material of the first type and thus has a more viscous behavior. In this way, the solder material of the second type forms a solder resist for the solder material of the first type. The solder resist is applied in the receiving portion around the joining portion. The solder resist in the form of a solder material of a second type is able to be arranged in the longitudinal direction of the joining portion before and/or after the solder material of the first type.

The solder resist is also able to be implemented in a different way, for example in the form of a mechanical solder stop barrier, such as a solder stop ring.

In the present disclosure, the joining portion has two outwardly directed longitudinal webs and the receiving portion has longitudinal grooves extending in the region of the joining plane between the plate elements, the longitudinal webs extending in the longitudinal grooves.

The plate elements are joined by soldering while incorporating the joining portion of the connecting piece in the receiving portion of the plate body. The longitudinal webs and the longitudinal grooves complement each other. The contour or configuration of the longitudinal webs and the longitudinal grooves ensures a technologically necessary joining gap. The joining surfaces are optimized. The joining gap, for example, the width of the joining gap, is uniform over the circumference or the course between the joining portion and the receiving portion without any sudden variation in thickness. The gap width is small. A high-strength, tight joint by material bond of the connecting piece with its joining portion in the receiving portion of the plate body is achieved.

The joining portion has two convexly curved wall portions that extend between the longitudinal webs. The wall portions are curved elliptically or in the shape of an elliptical portion.

The two curved wall portions run mirror-symmetrically to a transverse axis of the joining portion, for example, the central longitudinal axis, and each transition at a respective end into a longitudinal web. The wall portions are convexly curved towards the center or the central longitudinal axis of the joining portion. In the web portions, the side surfaces are concavely curved.

In one embodiment of the joining portion, the joining portion of the connecting piece has an elliptical or elliptically shaped outer contour in cross section with outwardly directed longitudinal webs lying opposite one another on a transverse axis.

The joining portion is able to have upper and lower wall portions that are flattened in cross section, for example, the middle wall portions, which respectively transition into a longitudinal web at the ends via convexly curved wall portions.

The receiving portion of the plate body forms an insertion or joining region for the connection portion of the connecting piece.

The connecting piece has longitudinal webs in the joining portion on both sides that extend in the longitudinal direction of the connecting piece. These are triangular in cross-section with concave web walls and a rounded tip. The contour of the longitudinal webs ensures a smooth transition from the elliptical outer contour to the longitudinal webs with rounded outer surfaces without steps or sharp curves or angles.

The longitudinal grooves of the receiving portion are configured in a funnel-shaped cross section with concave groove faces and a wedge-shaped groove base in relation to the center point or the central longitudinal axis of the connecting piece and the receiving portion. The inner contour in the region of the inner corner of the receiving portion formed by the groove faces is rounded along the groove faces. The groove base at the transition from the receiving portion to the plate elements that come into contact with one another is acute-angled.

The configuration of the longitudinal webs and of the longitudinal grooves are designed to complement each other. The contours of the longitudinal web and the longitudinal groove complement each other in such a way that the longitudinal webs interact in the longitudinal grooves in the manner of a tongue and groove connection, wherein a joining gap is formed between the contours.

The joining portion has two convexly curved wall portions. These respectively extend between the opposite longitudinal webs and transition into the concave web walls.

The receiving portion has convexly curved inner wall portions, which are adjoined by the concave groove faces.

The indications "convex" and "concave" refer to the respective center point and the longitudinal axis of the connecting piece, respectively. A convex surface, a convex wall, or a convex wall portion is a surface or portion that is curved outwards from the center or the central longitudinal axis of the connecting piece.

A concave surface, a concave wall portion, or a concave groove face is a surface, portion or face that is arched or curved inwards with respect to the center or the central longitudinal axis of the connecting piece.

A method for producing a cooling plate with a connecting piece has the following steps:
  providing a connecting piece which has a joining portion and a coupling portion for connecting a cooling fluid line;
  providing a first plate element and a second plate element, wherein the first plate element and the second plate element have forming portions, which are provided and designed for forming a receiving portion for the joining portion of the connecting piece;
  inserting the first plate element, the second plate element and the connecting piece into a heated mold soldering tool which has a lower tool and an upper tool, wherein the joining portion of the connecting piece is positioned between forming portions of the plate elements and at least one solder resist is arranged between the joining portion and the forming portions;
  closing the mold soldering tool and clamping the plate elements and the joining portion between the lower tool and the upper tool, wherein the forming portions of the plate elements are formed at the ends around the joining portion of the connecting piece while forming a receiving portion;
  heating the plate stack;
  applying internal pressure to a space between the plate elements of the plate stack by introducing an active medium into the space via the connecting piece and forming a channel in at least one plate element;
  melting the solder material between the plate elements and between the joining portion and the receiving portion and joining using soldering;
  opening the mold soldering tool and removing the cooling plate from the mold soldering tool.

The forming portions of the circuit board elements are able to be preformed and have a receiving contour in or between which the joining portion of a connecting piece is received.

Alternatively or additionally, a solder resist is able to be positioned or designed on the connecting piece, for example, in the form of an annular bead, so that the solder resist rests on the front side of the opening of the receiving portion.

The method according to the present disclosure is improved in terms of process technology and enables the production of high-quality heat exchanger plates with an optimized connection of the connecting pieces thereto in an efficient manner.

A heat exchanger plate has multiple connecting pieces, for example, a plate body has a connecting piece for supplying and a connecting piece for discharging a cooling fluid.

The mold soldering tool is heatable and heated to a tool temperature required for soldering purposes to produce the cooling plates.

A plate stack is formed from at least two plate elements made of a metallic material, for example, a light metal material. A solder material is applied between the plate elements.

In the context of the present disclosure, plate elements which are provided with a solder material are effectively used, wherein the solder material is applied to at least one of the plate elements in the form of a plated solder layer. Of the plate elements which are provided at least one plate element is already provided with a solder material.

The solder material for material connection of the connecting piece or joining portion of the connecting piece and the receiving portion of the plate body are able to be pre-applied on the forming portions of the plate elements and/or on the joining portion. The solder material is able to be arranged in the form of soldering sleeves, soldering foils or soldering material rings on the joining portion of the connecting piece.

A plate stack is formed from the two plate elements. When forming the plate stack, the connecting piece is positioned with its joining portion between the plate elements. For this purpose, the joining portion is arranged between forming portions on the plate elements.

The plate stack is placed in the hot forming tool and the mold soldering tool is closed. The plate stack is able to be formed outside the mold soldering tool and brought into the mold soldering tool. The plate stack is able to be formed in the mold soldering tool.

The mold soldering tool has a lower tool and an upper tool. These are displaced relative to one another during the closing movement of the hot forming tool, for example, the upper tool is lowered onto the lower tool. During the closing movement, the plate stack is picked up and clamped between the lower tool and the upper tool. The plate stack comes into surface contact between the lower tool and the upper tool and is heated in the mold soldering tool. The mold soldering tool is heated to a tool temperature at which both the forming process and the soldering joining process are carried out. The tool temperature is between 540° C. and 670° C. or between 550° C. and 640° C.

When the mold soldering tool is closed, the forming portions of the plate elements are formed in their final form around the joining portion of the connecting piece and the receiving portion is formed out. In the joining plane between the plate elements, longitudinal grooves extend along the receiving portion.

The body made of solder material is able to have lateral longitudinal webs that are geometrically adapted to the shape of the longitudinal grooves of the receiving portion. An annular body made of solder material is used, which has two longitudinal webs in the longitudinal direction. These are able to be triangular and protrude outwards in the direction of the longitudinal grooves. The longitudinal webs run in the longitudinal direction of the solder material body. In this way, the space between the joining portion of the connecting piece and the receiving portion is filled by the soldering material in terms of process technology and component technology.

A space between the plate elements of the plate stack is subjected to internal pressure. A space is a region between the adjacent plate elements, although there does not necessarily have to be a gap between the plate elements in the region of the space. The space is subjected to an internal pressure by introducing an active medium, for example, nitrogen, into the space. In this process, a channel is formed by internal pressure forming of at least one plate element region into a channel cavity in one or the contact surfaces of the mold soldering tool. The active medium is supplied via one of the connecting pieces of the plate stack.

The active medium for forming the channel or the channel structure in the plate body is introduced via the connecting piece or one of the connecting pieces.

The solder material between the plate elements and the plate elements and the connecting piece is melted as a result of the tool temperature of the mold soldering tool. The plate elements are joined with each other and the connecting piece is joined with the plate elements in the region of the receiving portion by soldering.

The mold soldering tool is opened after completion of the forming and soldering process, wherein the lower tool and the upper tool are displaced relative to one another and moved apart. The joined warm plate body or the cooling plate is able to be removed from the mold soldering tool after opening. Before removal, the cooling plate is able to be held in the hot forming tool and cooled down. Cooling takes place to below the melting temperature of the solder material.

The plate stack is clamped between the lower tool and upper tool when producing the cooling plates. During the internal pressure forming and formation of the channel, the plate stack is sealed circumferentially along adjacent edge regions and/or adjacent to the channel cavity. For sealing or to support sealing, pressure elements are able to be provided in the lower tool and/or in the upper tool. Such pressure elements are also able to be provided in the region of the connecting piece. The pressure elements are able to be formed by appropriate contouring in the forming portions of the lower tool and/or the upper tool, for example by sealing beads. The sealing elements are able to be provided circumferentially along adjacent edge regions of the upper tool and/or lower tool. The sealing elements are further arranged in such a way that the receiving portion with the connection portion of the connecting piece arranged therein is clamped and sealed or is clamped and sealed during the expansion process and soldering process. Sealing elements are able to be provided adjacent to the channel cavity. The sealing elements ensure a forming process, such that the forming process takes place in the region of the channel cavity and in the region of the connecting contour of the connecting piece. In this way, a high level of dimensional stability and forming accuracy is ensured.

A cooling device for a vehicle battery has a cooling plate and method of producing the same according to the present disclosure. The cooling device includes the peripheral components and device components for cooling a vehicle battery, such as cooling fluid lines, storage and expansion tanks for cooling fluid, cooling fluid supply and/or pump units and/or recoolers.

BRIEF DESCRIPTION OF THE DRAWINGS

The present disclosure is described in more detail hereinafter on the basis of drawings. In the drawings.

DETAILED DESCRIPTION

A cooling plate 1 according to the present disclosure and modifications of the connection for a cooling fluid line to a cooling plate 1 are explained with reference to the figures. In the figures, the same reference numerals are used for identical or functionally corresponding components or component parts.

A cooling plate 1 is for battery cooling for a vehicle battery of a motor vehicle.

Figure 1:
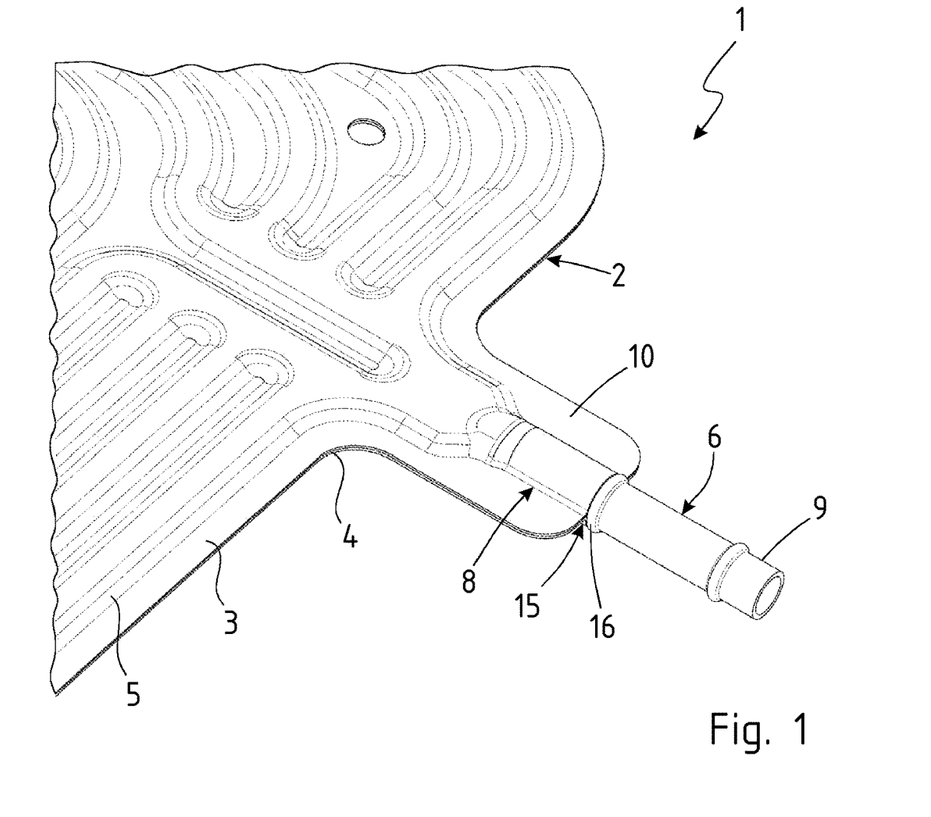
FIG. 1 shows a perspective view from above of a portion of a heat exchanger plate according to the present disclosure.
Figure 2:
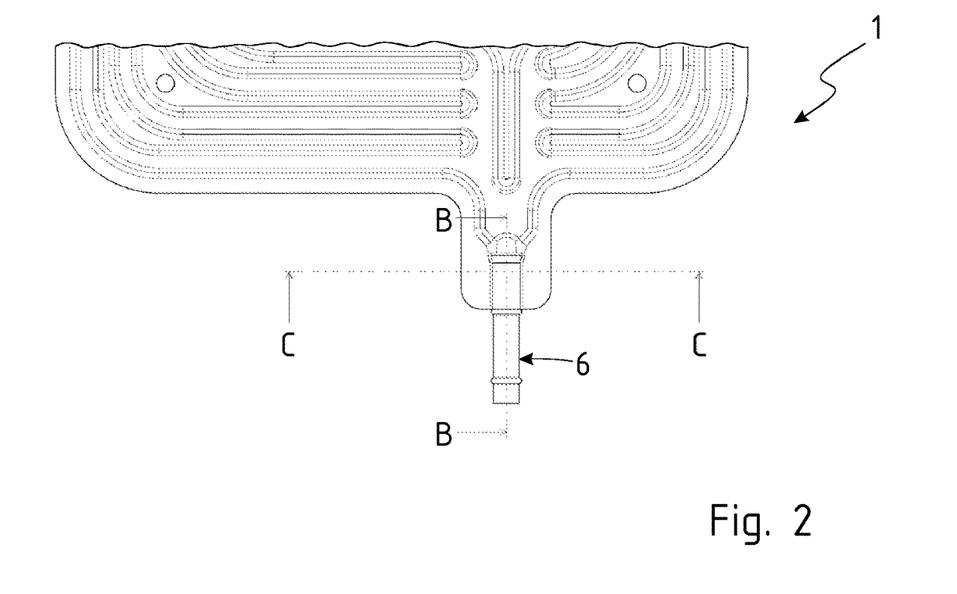
FIG. 2 shows a portion of the cooling plate in a top view according to the present disclosure.

The cooling plate 1 has a plate body 2 formed from two plate elements 3, 4. The plate element 3 is a channel plate which has a channel structure including at least one channel 5. The plate element 4 is a completely or almost completely flat base plate.

The two plate elements 3, 4 are positioned flat on top of each other and form the plate body 2. The adjacent surfaces of the plate elements 3, 4 are completely or partially provided with a solder material. A solder material in the form of a plated solder layer is preemptively applied to one of the plate elements 3, 4.

The adjacent surfaces of the plate elements 3, 4 are joined together completely or in some portions. A connecting piece 6 for a cooling fluid is connected to the plate body 2. The connecting piece 6 is used to supply or discharge a cooling fluid. One connecting piece 6 is provided for supplying a cooling fluid, whereas a cooling fluid is discharged via another connecting piece 6.

The connecting piece 6 has a joining portion 7 which is joined in a receiving portion 8 of the plate body 2 formed between the plate elements 3, 4.

The free end portion of a connecting piece 6, which projects relative to the plate body 2, is configured as a coupling portion 9 and is used to connect a cooling fluid line, which is able to be fastened to the coupling portion 9.

To produce a cooling plate 1 with at least one connecting piece 6, a connecting piece 6 is provided, which has a joining portion 7 and a coupling portion 9. A first 3 and second plate element 4 are provided. The two plate elements 3, 4 are flat. At least one of the plate elements 3, 4 is provided with a solder material. Each plate element 3, 4 has a projecting forming portion 10. A receiving contour for the joining portion 7 of the connecting piece 6 is able to be formed in the forming portion 10. A plate stack is formed from the two plate elements 3, 4, wherein the joining portion 7 of the connecting piece 6 is arranged between the forming portions 10 and the receiving contours provided there. A solder material 11 is applied to the connection portion 7.

The plate elements 3, 4 are arranged in a heated mold soldering tool. For this purpose, a plate stack is able to be formed from the two plate elements 3, 4 and the connecting piece 6 outside of the mold soldering tool. The plate stack is able to be formed in the mold soldering tool.

The plate elements 3, 4 and the connecting piece 6 with the positioned joining portion are inserted into the heated mold soldering tool. The joining portion 7 of the connecting piece 6 is arranged between the forming portions 10 of the plate elements 3, 4. The mold soldering tool has a lower tool and an upper tool. By closing the mold soldering tool, the plate stack is clamped between the upper tool and the lower tool and heated to soldering temperature. The underside of the plate stack is in surface contact with the lower tool and its upper side is in surface contact with the upper tool.

When the mold soldering tool is closed, the forming portions 10 are formed conclusively. The forming portions 10 and the receiving contours that are able to be provided there are formed onto the outer contour of the joining portion 7. This forms a joining gap 12 into which the solder material 11 is received and pressed. The formed forming portions 10 complement each other to form the receiving portion 8. Longitudinal grooves 13 extend in the region of the joining plane FE between the plate elements 3, 4 (see FIG. 4 and FIG. 5).

When the mold soldering tool is closed, the plate stack clamped between the lower tool and the upper tool is heated. A space between the plate elements 3, 4 is subjected to internal pressure. This is done by introducing an active medium, for example, nitrogen, into a space between the plate elements 3, 4. As a result, a channel 5 is formed by internal pressure forming. When forming the channel, a plate element region of the upper plate element 3, which forms the channel plate, is formed into a channel cavity in the upper tool. Channel portions of the channel 5 run into one another in a loop and communicate between the connecting piece 6 shown here and another connecting piece, not shown.

The soldering material applied between the plate elements 3, 4 and the soldering material 11, which is applied between the receiving portion 8 and the joining portion 7, becomes molten under the influence of temperature in the mold soldering tool. The molten solder wets the surfaces of the joining portion 7 and of the receiving portion 8 delimiting the joining gap 12. After the soldering material has cooled and solidified, a cohesive soldering joint is produced between the components. After the channel structure with the channel 5 has been formed and the soldering process has been completed, the mold soldering tool is opened and the cooled plate 1 is removed from the mold soldering tool.

Figure 3:
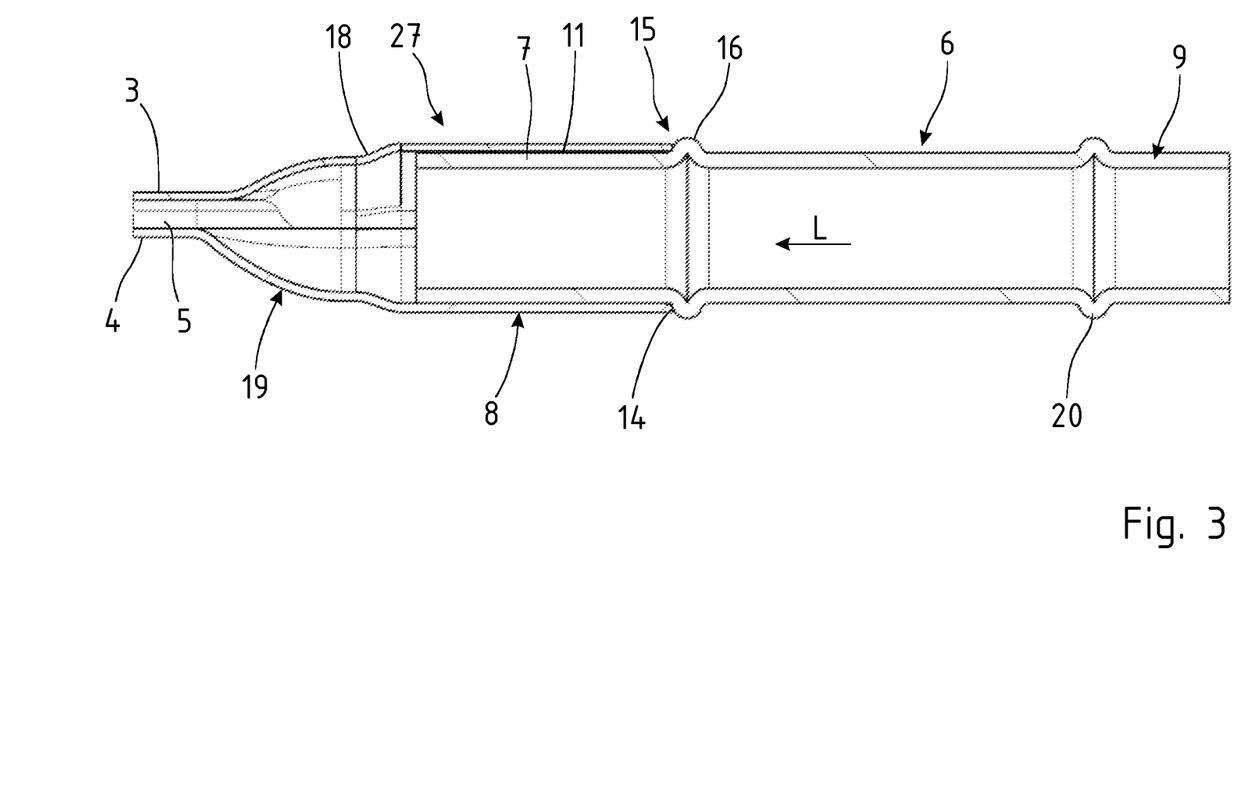
FIG. 3 shows a section through the cooling plate according to the representation of FIG. 2 along line B-B according to the present disclosure.
Figure 4:
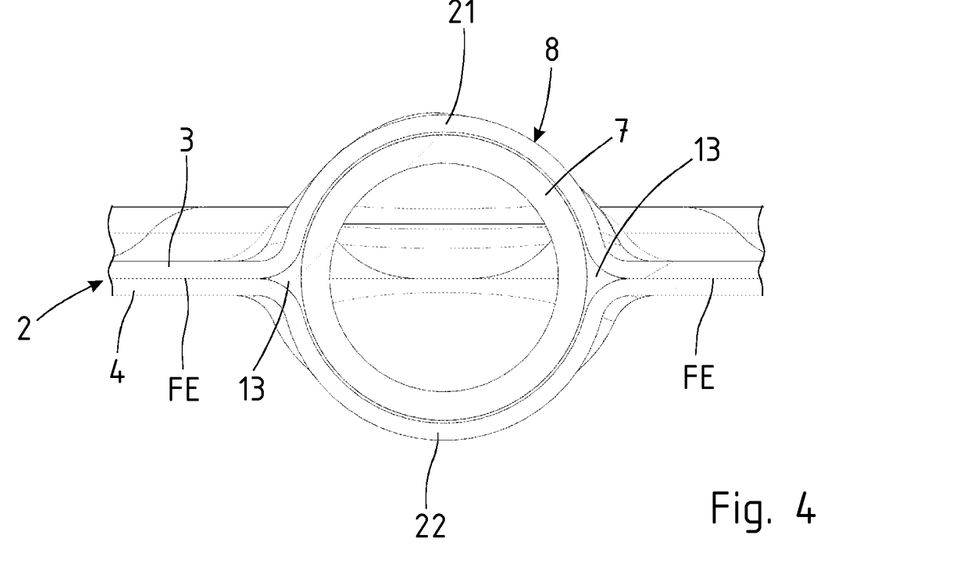
FIG. 4 shows a section through the representation of FIG. 2 along line C-C according to the present disclosure.

The connecting piece 6, as shown in FIG. 3, has a joining portion 7 which is circular in cross section (see also FIG. 4). A solder resist 15 is provided on the front side in front of the opening 14 of the receiving portion 8. The solder resist 15 is formed by an annular bead 16, which is formed integrally with the wall 17 of the connecting piece 6 using the same material. The annular bead 16 lies or abuts the receiving portion 8 on the front side and extends circularly around the opening 14.

The joining portion 7 extends in the longitudinal direction L in the receiving portion 8. On the side facing away from the opening 14, the receiving portion 8 tapers through a shoulder region 18 and a funnel contour 19 and merges into the channel 5 formed between the plate elements 3, 4. This configuration supports laminar flow conditions when supplying and/or discharging a cooling fluid.

The coupling portion 9 is circular in cross section.

An abutment body is formed in the form of an annular bead 20 in the coupling portion 9. The annular bead 20 is formed from the wall 17 of the connecting piece 6 or coupling portion 9. A cooling fluid line, such as a cooling fluid hose, is able to be inserted onto the coupling portion 9 and the annular bead 20 and fastened by means of a suitable fastening means, for example, a spring clamp.

The joining portion 7 of the connecting piece 6 is able to have a circular cross section. This is shown in the illustration in FIG. 4. The circumferential joining gap 12 as well as the longitudinal grooves 13 at the transition to the plate elements 3, 4 lying next to one another in the joining plane FE is filled with soldering material 11 after the soldering joining.

The upper and lower forming portions 10 forming the receiving portion 8 extend along a circular arc portion-shaped curve that complements the outer contour of the joining portion 7. The upper wall portion 21 and the lower wall portion 22 of the receiving portion 8 are semicircular.

Figure 5:
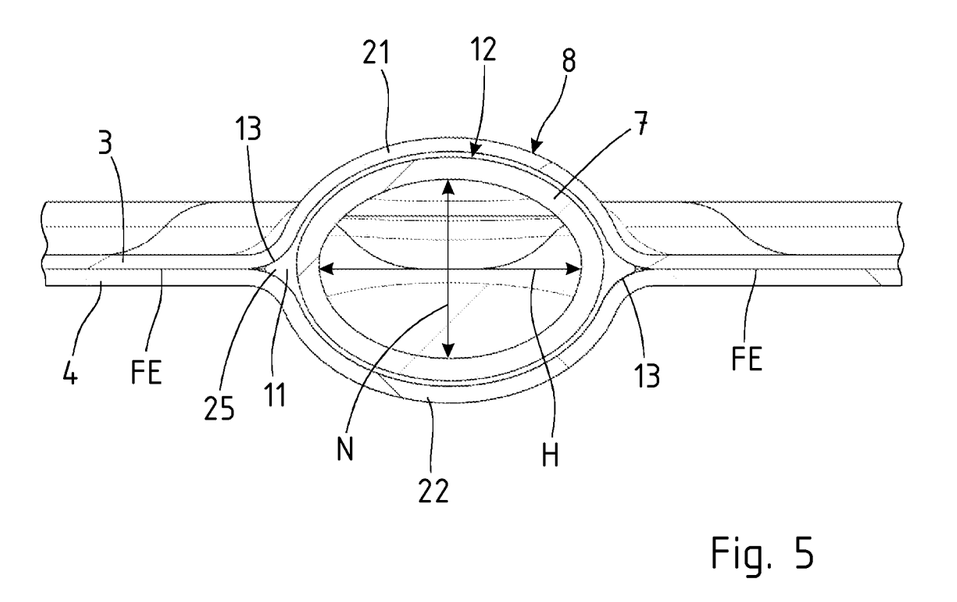
FIG. 5 shows a portion through a cooling plate along a line C-C as in FIG. 2 with the representation of a further cross-sectional configuration according to the present disclosure.

An alternative cross-sectional configuration of the joining portion 7 and the receiving portion 8 is shown in FIG. 5. The joining portion 7 has an elliptical cross section. The joining portion 7 has a major axis H and a minor axis N perpendicular thereto in cross section. The major axis H corresponds to the central transverse axis and describes the largest dimension of the joining portion 7. The major axis H extends in the joining plane FE of the plate elements 3, 4. The minor axis N is the smallest dimension of the joining portion 7 in a radially outward direction. The upper wall portion 21 and the lower wall portion 22 of the receiving portion 8 are configured to complement the elliptical cross-sectional configuration of the joining portion 7.

FIG. 6 to FIG. 9 show embodiments of a connecting piece 6 with a joining portion 7 and a coupling portion 9. An annular body 23 made of solder material 11 is applied to the joining portion 7.

Figure 6:
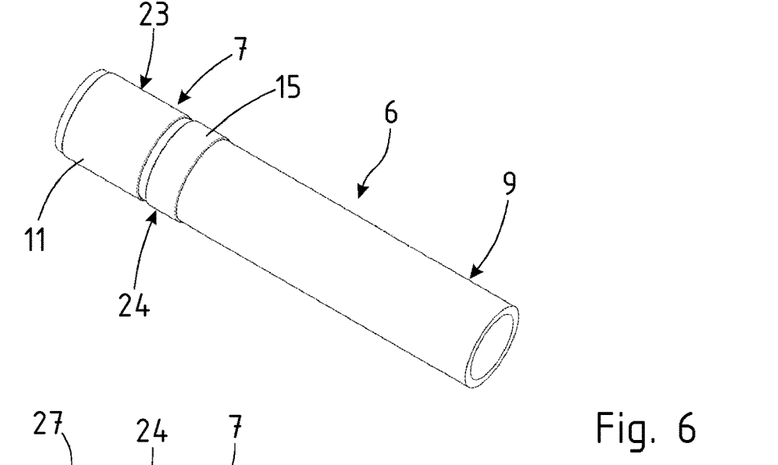
FIG. 6 to FIG. 16 each show a perspective view of various connecting pieces and solder resists according to the present disclosure.

In the embodiment according to the illustration in FIG. 6, a solder resist 15 is arranged in front of the solder material 11 in the longitudinal direction L of the connecting piece 6. The solder resist 15 is formed by a ring body 24 made of a sealing metal. The sealing metal has a higher melting temperature than the soldering material 11 used for the soldering joint. Under the influence of temperature in the mold soldering tool, the sealing metal becomes plastic and deforms as a result of the pressure from the mold soldering tool. The sealing metal seals the region between the solder material 11 and the opening 14 of the receiving portion. In this way, the solder flow is limited to the joining region between the joining partners. Blowing out of the solder material that is molten in the soldering tool by the internal pressure applied to form the channel 5 is able to be prevented.

Figure 7:
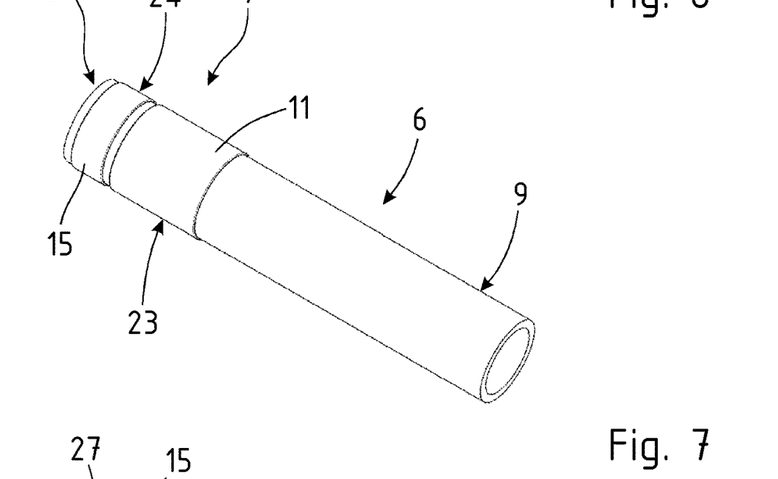

In the embodiment variant shown in FIG. 7, the solder resist 15 is also formed by an annular body 24 made of a sealing metal. This is applied in the longitudinal direction L of the connecting piece 6 in front of the solder material 11.

Figure 8:
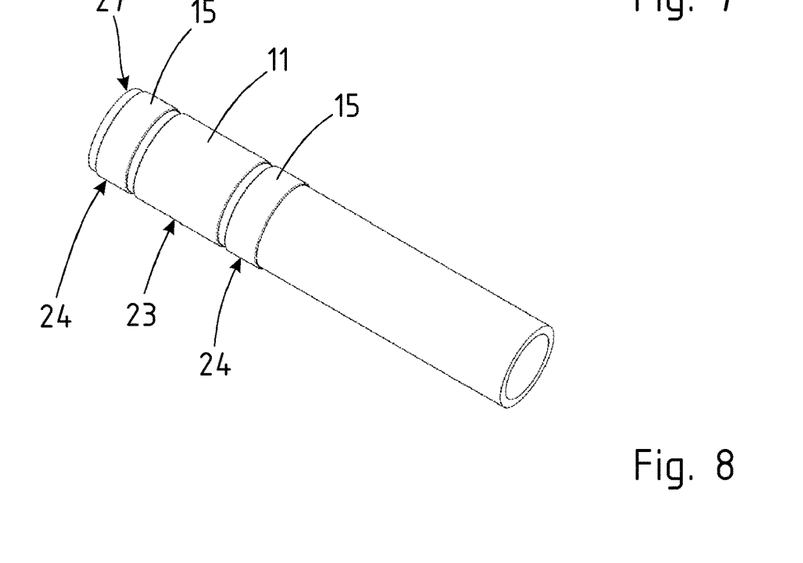

The embodiment of FIG. 8 provides that a solder resist 15 in the form of a ring body 24 is arranged in front of the ring body 23 made of solder material 11 and a solder resist 15 formed by a ring body 24 made of sealing metal is arranged behind the solder material 11.

Figure 9:
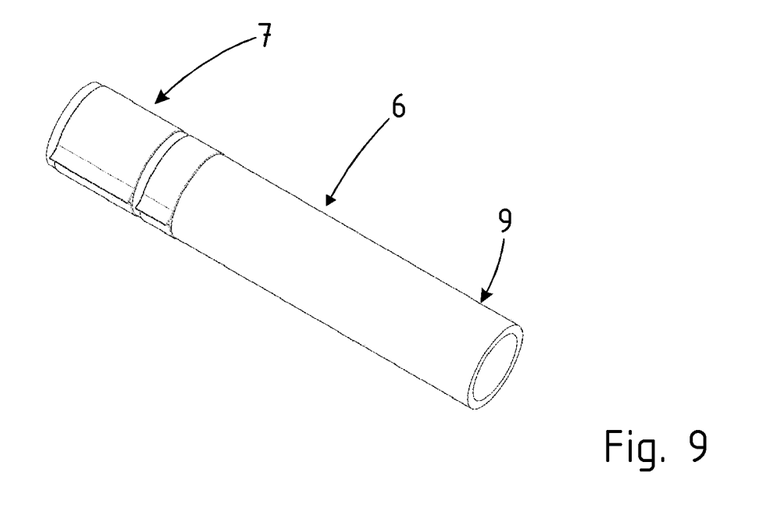

In the case of the connecting piece 6, as shown in FIG. 9, and the solder material 11 applied there to the joining portion 7 and the solder resist 15, both the ring body 23 made of solder material 11 and the ring body 24 made of sealing metal are configured to adapt to the contour of a joining gap 11 and the inner contour of the receiving portion 8. The ring body 23 made of solder material 11 and the ring body 24 made of sealing metal have lateral longitudinal webs 25, 26. The longitudinal webs 25, 26 are geometrically adapted to the inner contour of the longitudinal grooves 13 of the receiving portion 8. The longitudinal webs 25, 26 are configured approximately triangular in cross section and protrude outwards in the direction of the longitudinal grooves 13.

Figure 10:
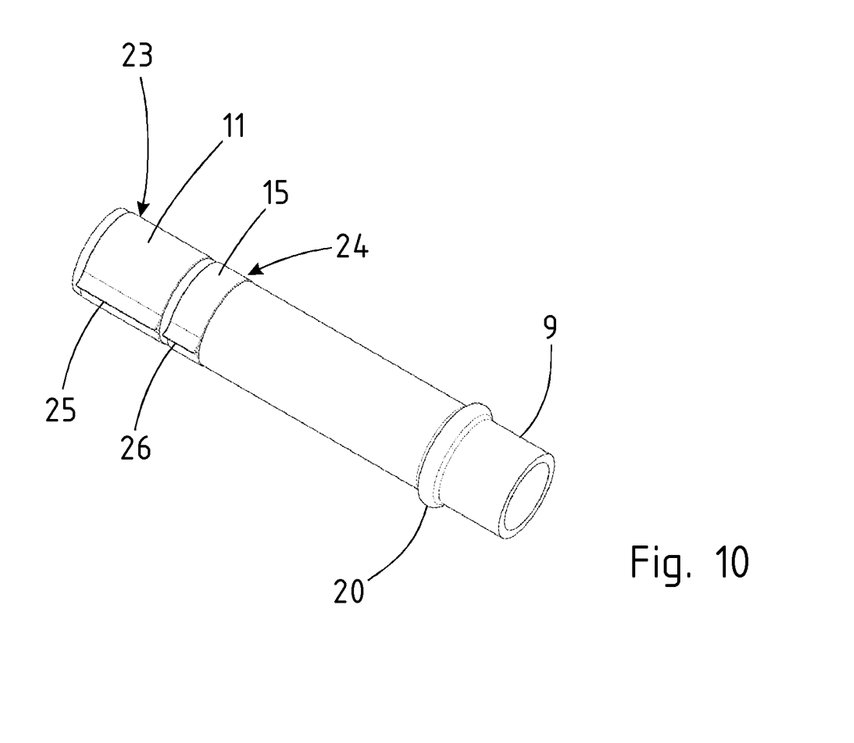

A configuration of a connecting piece 6 with an annular body 23 made of solder material 11 and solder resist 15 in the form of an annular body 24 made of sealing metal and longitudinal webs 25, 26 is also shown in the representation of the connecting piece 6 in FIG. 10. The connecting piece 6 has a coupling portion 9 with an abutment body shape of an annular bead 20.

Figure 11:
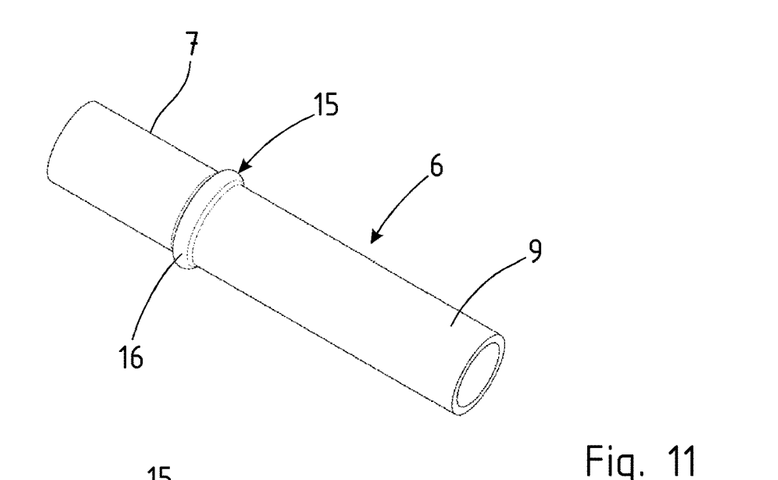
Figure 12:
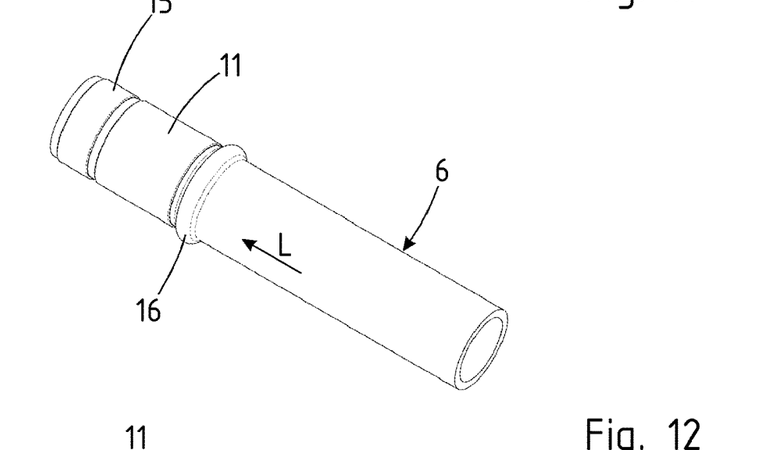

FIG. 11 to FIG. 13 again illustrate a connecting piece 6 with a joining portion 7 and a coupling portion 9. In the longitudinal direction, a solder resist 15 in the form of a circumferential annular bead 16 is positioned in front of the joining portion 7. An annular body 23 made of a solder material 11 and an annular body 24 made of a sealing metal as a solder resist 15 are applied to the joining portion 7. The solder resist 15 is applied in the longitudinal direction L on the side 27 of the connecting piece 6 facing the plate body 2 behind the solder material 11.

Figure 13:
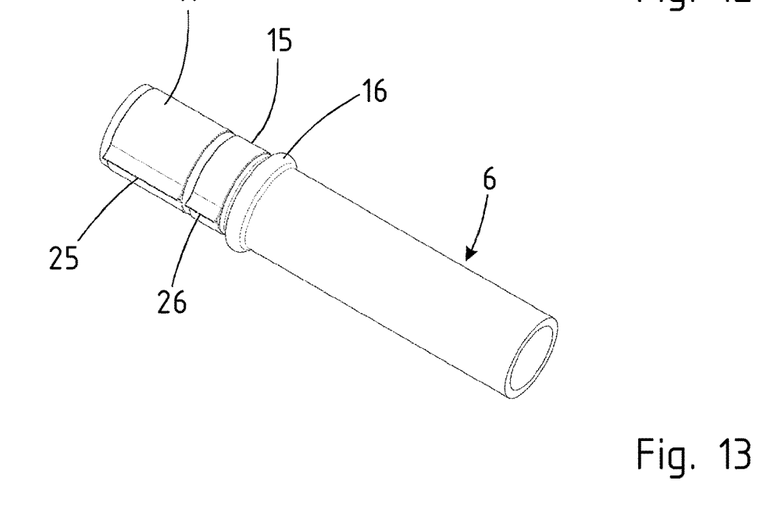

In the present disclosure, with respect to the connecting piece 6, as shown in FIG. 13, the solder resist 15 is applied in the longitudinal direction L in front of the soldering material 11. Both the solder resist 15 and the solder material 11 have longitudinal webs 25, 26.

Figure 14:
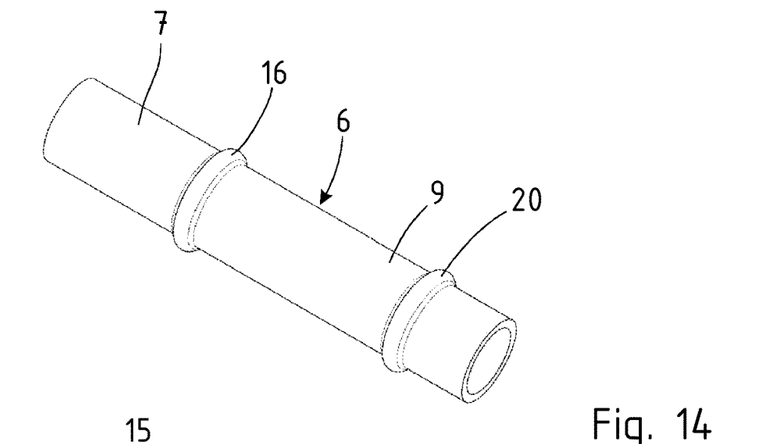
Figure 15:
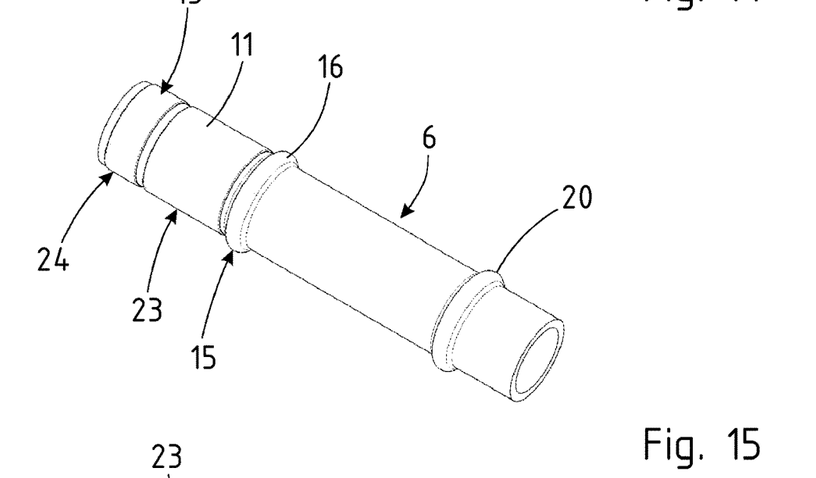
Figure 16:
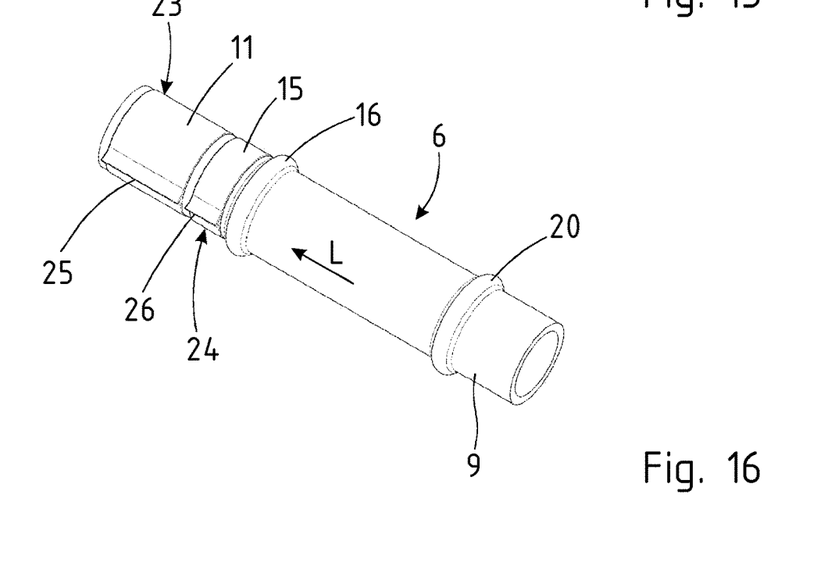

The representation of the connecting piece 6 according to FIG. 14 to FIG. 16 correspond to the explanations above, with an abutment in the form of a circumferential annular bead 20 being provided in the coupling portion 9.

The solder resist 15, both as an annular bead 16 and as an annular body 24 made of sealing metal, is positioned so that the solder flow is limited when producing the solder connection between the joining portion 7 and the receiving portion 8. This is possible in a process-safe manner using the solder resist 15. The soldering material 11, which is molten in the mold soldering tool, is prevented from blowing out of the joining gap 12.

Figure 17:
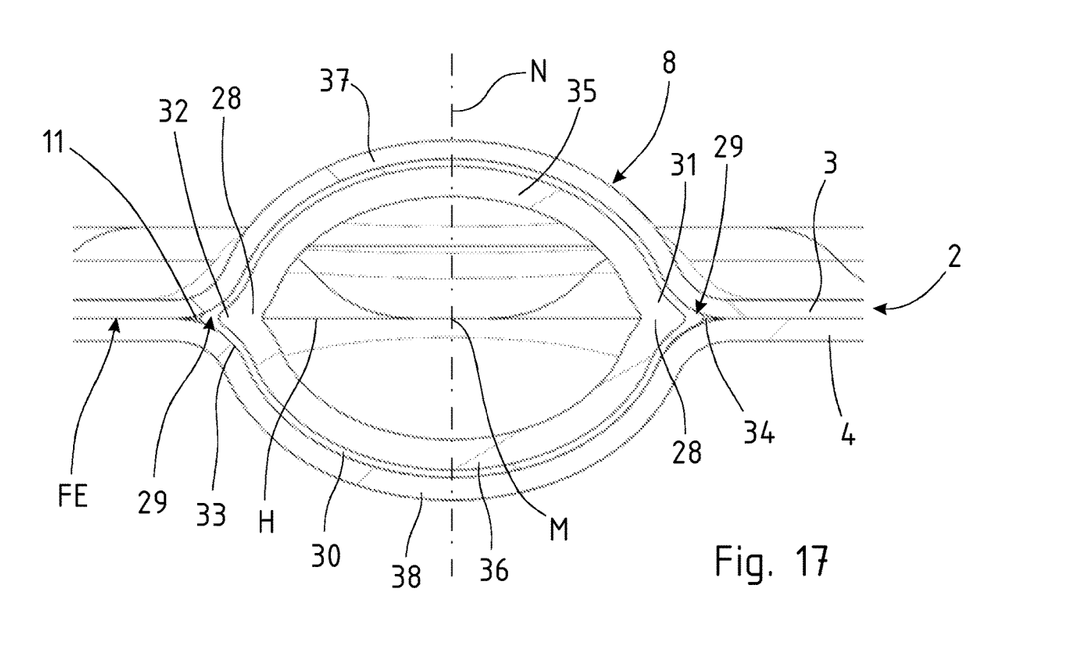
FIG. 17 shows a cross section through the connection region of a connecting piece according to line B-B of FIG. 2 according to the present disclosure.

In the connection configuration explained with reference to FIG. 17, the plate body 2 of a heat exchanger plate 1 is formed from two plate elements 3, 4, as described above. The connecting piece 6 has a joining portion 7 which is joined in a receiving portion 8 of the plate body 2 formed between the plate elements 3, 4.

The joining portion 7 of the connecting piece 6 has a major axis H in cross section and a minor axis N perpendicular thereto. The major axis H corresponds to the central transverse axis and describes the largest dimension of the joining portion 7. The major axis H extends in the joining plane FE of the plate elements 3, 4. The minor axis N is the smallest dimension of the joining portion 7 in a radially outward direction.

The joining portion 7 has two outwardly directed longitudinal webs 28. The longitudinal webs 28 lie opposite one another on the major axis H of the connecting piece 6. The longitudinal webs 28 are an integral component of the joining portion 7 using the same material and are directed outwards from the inside of the connecting piece 6.

The joining portion 7 of the connecting piece 6 lies in the receiving portion 8 of the plate body 2 and is joined by material bond. The receiving portion 8 has longitudinal grooves 29 extending between the plate elements 3, 4 in the region of the joining plane FE. The longitudinal webs 28 of the joining portion 7 run in the longitudinal direction L of the receiving portion 8 in the longitudinal grooves 29.

The longitudinal webs 28 and the longitudinal groove 29 complement each other. This means that the contour of the longitudinal grooves 29 and the contour of the longitudinal webs 28 complement each other to form a joining gap 30. The longitudinal webs 28 and the longitudinal grooves 29 interact like a tongue and groove.

The longitudinal webs 28 are triangular in cross-section and have web walls 31 which are concavely curved and end in a rounded tip 32.

The longitudinal grooves 29 have a funnel-shaped cross-section and have concave groove faces 33 and a wedge-shaped groove base 34.

The indications "convex" and "concave" each refer to the center point M of the connecting piece 6.

The joining portion 7 has a convexly curved upper wall portion 35 and a convexly curved lower wall portion 36. The longitudinal webs 28 respectively adjoin the wall portions 35, 36 on both sides. The wall portions 35, 36 transition into the web walls 31 of the longitudinal webs 28.

The receiving portion 8 has convexly curved receiving wall portions 37, 38, each of which transitions into a groove face 33.

The joining portion 7 is cohesively joined in the receiving portion 8 by a solder material 11 applied in the joining gap 30. When the plate elements 3, 4 and the joining portion 7 are joined by soldering, the solder material 11 is melted, the joining gap 30 is wetted and filled with solder material 11 across its entire surface, and the components are joined by material bond.

The cross-sectional contour of the joining portion 7 is able to be described as a lemon shape or lemon-shaped, wherein the cross-section indication is based on a longitudinal portion through a lemon.

The outer contour of the joining portion 7 and the inner contour of the receiving portion 8 complement each other, forming the joining gap 30.

Figure 18:
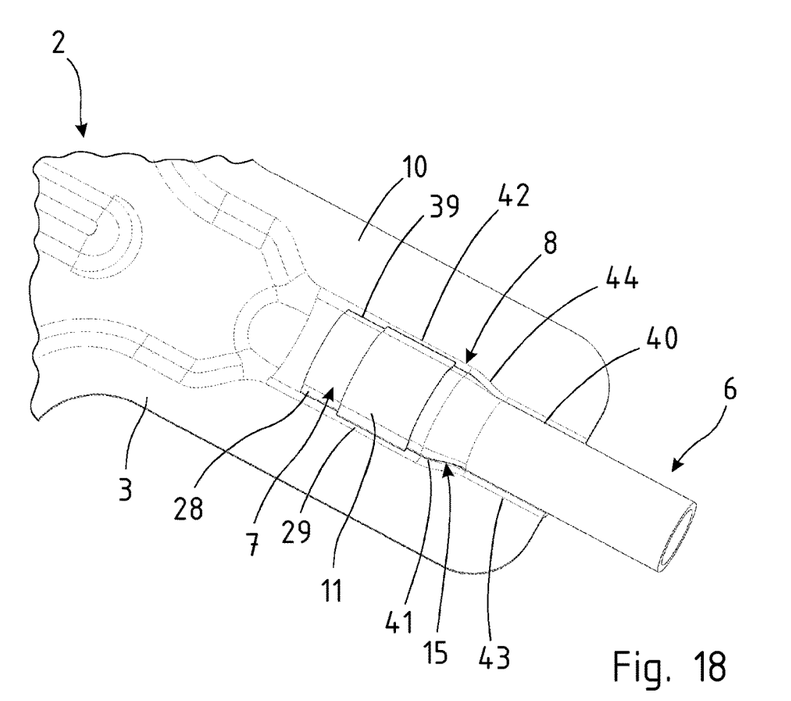
FIG. 18 shows a portion of a plate body with the representation of another connection configuration according to the present disclosure.

FIG. 18 shows a portion of a plate body 2 with a view of a plate element 3 and the part of the receiving portion 8 formed in the forming portion 10. The joining portion 7 of the connecting piece 6 is positioned in the receiving portion 8. The joining portion 7 has a front longitudinal portion 39 on the plate body side and a rear longitudinal portion 40. The front longitudinal portion 39 of the joining portion 7 is lemon-shaped in cross section and has lateral longitudinal webs 28. With regard to the cross-sectional configuration of the front longitudinal portion 39 of the joining portion 7, reference is made to the above statements regarding the representation of FIG. 17. The front longitudinal portion 39 has the lemon-shaped cross-sectional configuration with lateral longitudinal webs 28 and the upper wall portions and lower wall portions running in a convex curve between them.

The front longitudinal portion 39 of the joining portion 7 tapers into the rear longitudinal portion 40 via a transition portion 41. In the rear longitudinal portion 40, the joining portion 7 is circular.

The receiving portion 8 also has two longitudinal portions 42, 43 with different cross sections. The front longitudinal portion 43 of the receiving portion 8 on the side of the plate body has longitudinal grooves 29 extending between the plate elements 3, 4 in the region of the joining plane FE. Via a transition portion 44, the front longitudinal portion 43 transitions into the rear longitudinal portion 44, which is adapted to the circular contour of the longitudinal portion 40.

The front longitudinal portion 39 of the joining portion 7 is expanded compared to the circular rear longitudinal portion 40 and widened, as seen in the joining plane FE of the plate elements 3, 4. The change in cross-section in the connecting piece 6 at the transition portion 41 and the change in cross-section in the receiving portion 8 at the transition portion 44 complement each other and form a solder resist 15. In addition, the shoulder-like transition and the taper in the transition portions 41 and 44 form an abutment between the connecting piece 6 and the joining portion 7 and the receiving portion 8. This acts as a pull-out and push-out protection, on which the connecting piece 6 is supported during the internal pressure formation of the channel structure. At the same time, the joining gap in the transition is reduced and the solder flow is limited.

A solder material 11 is applied to the joining portion 7. The change in cross-section in the joining portion 7 and in the receiving portion 8 forms a solder resist 15. The solder resist 15 formed by the change in cross-section limits the solder flow during the production of the solder connection between the connecting piece 6 or the joining portion 7 and the receiving portion 8.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A heat exchanger plate, comprising:
a plate body comprising at least two plate elements; and
at least one connecting piece for a cooling fluid, wherein
the at least one connecting piece is joined to the at least two plate elements by a solder connection,
the at least one connecting piece comprises a joining portion which is joined in a receiving portion of the plate body between the at least two plate elements,
the joining portion comprises thereon a solder resist, and
the solder resist comprises a sealing metal with a higher melting temperature than a solder material of the solder connection.

2. The heat exchanger plate according to claim 1, wherein the solder resist is, in a longitudinal direction of the joining portion, adjacent to the solder connection on the joining portion.

3. The heat exchanger plate according to claim 1, wherein the solder resist comprises an annular bead on an end face of the receiving portion.

4. The heat exchanger plate according to claim 3, wherein the annular bead is integrally formed with the at least one connecting piece.

5. The heat exchanger plate according to claim 1, wherein the joining portion comprises a circular cross-section.

6. The heat exchanger plate according to claim 1, wherein the joining portion comprises an elliptical cross-section.

7. The heat exchanger plate according to claim 1, wherein the joining portion comprises a rectangular cross-section with rounded corners.

8. The heat exchanger plate according to claim 1, wherein the joining portion and the receiving portion each comprise two longitudinal portions with different cross-sections.

9. The heat exchanger plate according to claim 1, wherein the at least one connecting piece comprises a coupling portion on an opening side and configured to connect a cooling fluid line.

10. The heat exchanger plate according to claim 9, wherein the at least one connecting piece further comprises an abutment body which is an annular bead in the coupling portion.

11. The heat exchanger plate according to claim 1, wherein, in a longitudinal direction of the joining portion, the solder connection is between the solder resist and the plate body.

12. The heat exchanger plate according to claim 1, wherein, in a longitudinal direction of the joining portion, the solder resist is between the solder connection and the plate body.

13. The heat exchanger plate according to claim 1, wherein
   the joining portion comprises thereon a further solder resist, and
   in a longitudinal direction of the joining portion, the solder connection is between the solder resist and the further solder resist.

14. The heat exchanger plate according to claim 1, wherein
   the at least one connecting piece further comprises an annular bead on an end face of the receiving portion, and
   in a longitudinal direction of the joining portion, the solder connection is between the solder resist and the annular bead.

15. The heat exchanger plate according to claim 1, wherein
   the at least one connecting piece further comprises an annular bead on an end face of the receiving portion, and
   in a longitudinal direction of the joining portion, the solder resist is between the solder connection and the annular bead.

* * * * *